United States Patent [19]

Christopher

[11] Patent Number: 5,259,673

[45] Date of Patent: Nov. 9, 1993

[54] APPARATUS AND METHOD FOR DETERMINING THE TIGHTNESS OF A STORAGE TANK

[76] Inventor: Dennis J. Christopher, 128 15th St., Hammonton, N.J. 08037

[21] Appl. No.: 687,301

[22] Filed: Apr. 18, 1991

[51] Int. Cl.$^5$ ............... G01F 23/10; G01M 3/26
[52] U.S. Cl. ........................ 374/43; 73/49.2; 73/149; 73/61.41; 374/170
[58] Field of Search ............ 374/43, 3, 116, 170; 73/295, 149, 864, 49.2, 61 R; 340/622

[56] References Cited

U.S. PATENT DOCUMENTS

| | | | |
|---|---|---|---|
| 2,694,930 | 11/1954 | Lamb et al. | 374/116 |
| 3,580,055 | 5/1971 | White | 73/292 X |
| 3,910,102 | 10/1975 | McLean | 73/40.5 R |
| 4,453,400 | 6/1984 | Senese et al. | 73/49.2 |
| 4,474,054 | 10/1984 | Ainlay | 73/49.2 |
| 4,561,291 | 12/1985 | Ainlay | 73/49.2 |
| 4,604,893 | 8/1986 | Senese et al. | 73/49.2 |
| 4,630,467 | 12/1986 | Senese et al. | 73/49.2 |
| 4,646,560 | 3/1987 | Maresca, Jr. et al. | 73/49.2 |
| 4,656,464 | 4/1987 | Cliffgard | 340/622 |
| 4,672,842 | 6/1987 | Hasselmann | 364/564 X |
| 4,679,425 | 7/1987 | Bolland | 73/49.2 |
| 4,725,551 | 2/1988 | Thompson | 436/3 |
| 4,732,035 | 3/1988 | Lagergren et al. | 73/49.2 |
| 4,773,265 | 9/1988 | Baillie et al. | 73/305 |
| 4,781,057 | 11/1988 | Hyfantis, Jr. et al. | 73/49.2 |
| 4,807,464 | 2/1989 | Janotta | 73/49.2 |
| 4,811,601 | 3/1989 | Tolan | 73/29 B |
| 4,813,275 | 3/1989 | Castor | 73/49.2 |
| 4,827,762 | 5/1989 | Hasselmann | 73/49.2 |
| 4,835,717 | 5/1989 | Michel et al. | 364/558 |
| 4,848,150 | 7/1989 | Baird et al. | 73/296 |
| 4,850,223 | 7/1989 | Carlin et al. | 73/49.2 |
| 4,852,054 | 7/1989 | Mastandrea | 364/509 |
| 4,853,694 | 8/1989 | Tomecek | 340/621 |
| 4,862,733 | 9/1989 | Hyfantis, Jr. et al. | 73/49.2 |
| 4,873,863 | 10/1989 | Bruhl et al. | 73/49.2 |
| 4,915,507 | 4/1990 | Janotta | 374/115 |
| 4,945,757 | 8/1990 | Schuster | 73/49.2 |
| 4,954,973 | 9/1990 | Jacob et al. | 73/49.2 X |
| 4,967,592 | 11/1990 | Lagergren et al. | 73/49.2 |
| 4,972,710 | 11/1990 | Uhlarik et al. | 73/292 |
| 4,984,449 | 1/1991 | Caldwell et al. | 73/49.2 |
| 4,993,257 | 2/1991 | Lagergren | 73/49.2 |

Primary Examiner—Daniel M. Yasich
Attorney, Agent, or Firm—Ward & Olivo

[57] ABSTRACT

An apparatus and method are provided utilizing volume measurement means and temperature determining means for empirically determining the coefficient of thermal expansion for a given fluid. Said apparatus and method are particularly suited for use in testing the tightness of storage vessels and may be used in conjunction with currently available tank testing equipment to provide more accurate leakage readings than may presently be obtained.

9 Claims, 2 Drawing Sheets

APPARATUS AND METHOD FOR DETERMINING THE TIGHTNESS OF A STORAGE TANK

BACKGROUND OF THE INVENTION

Storage tanks are routinely used to store hazardous substances, such as water products, petroleum products, chemical products and other manufacturing and industrial related liquid products. As public awareness has grown in recent years with respect to protecting the environment, various federal, state and local agencies have been directed by their respective governments to enforce laws and regulations governing the use of storage tanks that contain hazardous materials, and provide for periodic testing to detect possible leakage.

In the United States alone, there are several million underground petroleum storage tanks containing gasoline, kerosene and other fuels. In addition, there are unknown numbers of tanks containing various other hazardous substances. Although many of these tanks are made of noncorrosive fiberglass, the vast majority of underground tanks are made of steel. Consequently, the risk of corrosion failure of such a large number of tanks is significant. Undetected leaks present economic losses as well as the aforementioned environmental concerns. Thus, it is essential that such leaks be detected as soon as possible so that the tanks may be repaired or replaced. Indeed, current industry standards require that any detector employed in tank leak testing be capable of detecting leaks on the order of 0.05 gallons per hour for the more commonly encountered tanks. This capability is not easily or inexpensively achieved.

Several methods for detecting leaks in underground storage tanks are well known in the prior art. Most of these techniques use a quantitative approach to identify a leak or to determine the leak rate based on a measurement of volumetric changes of the product stored in the tank. The ability of prior art leak detection methods to accurately measure leakage is affected by certain variables such as temperature change, tank deformation, product evaporation, tank geometry and the physical characteristics of the stored product. The most significant of these factors is temperature variation, which causes dynamic expansion or contraction of the stored product on both a short-term and long-term basis. Indeed, changes in ambient temperature throughout the day are often large enough to "mask" an actual leak or cause a false leak reading where none exists. One critical problem facing tank testing entities is that changes in temperature in large underground tanks cannot accurately be correlated with volumetric changes in the underground tank fluid levels. For example, assuming that the coefficient of expansion of gasoline in a 10,000 gallon underground tank is known, a change of 0.01° F. per hour will cause for example, a 0.068 gallon change in the product volume per hour, thus offsetting or otherwise amplifying an observed leak rate. Because the coefficients of expansion for petroleum products are relatively high, conducting tank tightness tests is made difficult because rising temperatures can expand gasoline stored underground for example, at a rate equal to the leak, during the typical 5 to 10 hour test period. Problems of this type have been observed repeatedly in the field, and part of the problem is that the exact value for $\beta$, the coefficient of expansion, is unknown for any given stored fluid.

A number of methods for testing underground tanks are currently practiced. For example, U.S. Pat. No. 3,580,055, entitled "TANK SYSTEM TIGHTNESS TESTER", teaches that temperature and volume change should be compensated for when conducting leak tests. U.S. Pat. No. 4,954,973, discloses a method of detecting the volumetric changes the underground tank undergoes as a result of tank end deflection. The pressure against the tank ends is said to vary as a function of the specific gravity of the fluid contained. The specific gravity of the fluid to be tested is determined through the use of hydrometers. Also currently available are standardized tables which provide "$\beta$", the coefficient of expansion for specific fluids at specific temperatures. These tables can also be used in conjunction with measured specific gravities or densities of the stored fluid. Thus, while the prior art recognizes that for a given fluid, $\beta$ will vary with temperature, and the density will also vary, both of these variables impact on the ability to measure tank leaks.

With respect to calculating $\beta$, the coefficient of expansion, however, a series of tables are available that can be used to determine the thermal coefficient of expansion for various petroleum products. For example, separate tables for jet fuels and kerosene, diesel fuels, heating oils and standard gasoline provide $\beta$ as a function of the absolute temperature. This method is not practical for use in the tank testing industry. The value of $\beta$ for any particular fluid varies widely as impurities are introduced into the system. Thus, no number of tables can compensate for the tolerances of $\beta$ at petroleum refineries, octane levels, gasoline detergents, additives, other impurities, etc. The present invention solves this problem by deriving $\beta$ empirically by conducting a test that measures $\beta$ at one or a series of temperatures. By way of example, an actual sample of gasoline is drawn from the test system known as the "Petro-tite ®", at a temperature equal to the resultant value derived by circulating the gasoline throughout the tank, as disclosed in U.S. Pat. No. 3,580,055 (the '055 patent"). Thus, since the '055 patent circulates the gasoline, an average temperature can be siphoned away from the Petro-tite ® tester, tested to empirically derive $\beta$, and then returned to the Petro-tite ® closed system. The Petro-tite ® closed system is assumed, for the sake of argument, to include the underground tank. Because $\beta$ is derived empirically, no inaccurate table need be resorted to, and gasoline brands, octanes and numerous other impurity variations can be compensated for, thus allowing a more accurate tank leak test to be conducted. U.S. Pat. No. 4,954,973 states specifically that there is a need in the industry to actually measure the coefficient of expansion "from one temperature to another to actually measure the coefficient of expansion of the fluid in the tank." The patent then states that this is impossible to do under field conditions, and goes on to rely on published $\beta$ values, such as those published by and available from the American Petroleum Institute, 2101 L Street, N.W. Washington, D.C. 20037. The present invention is a departure from current industry practice, which is centered around the '055 patent.

Other prior art has specifically taught the use of specific $\beta$ values for different types of fluids. For example, U.S. Pat. No. 4,853,694, at table 6, lists a series of temperature coefficients, listing various factors depending on the grade of fuel. It is specifically this problem that the present invention solves.

SUMMARY OF THE INVENTION

The present invention is directed to an apparatus and method for detecting the tightness of a storage tank by empirically determining a precise coefficient of expansion ($\beta$) of the fluid (i.e., liquid or gas) being stored. The apparatus and method of this invention may be used in conjunction with tank testing equipment presently in use (such as the Petro-tite ® system) to provide far more accurate leakage readings than may currently be obtained by using known testing equipment alone.

The primary shortcoming of currently used testing equipment is their reliance on standardized tables listing previously determined coefficients of expansion for various fluids. Using gasoline as an example, its coefficient of expansion has been determined to be 0.00068 at 60° F. Coefficients at other temperatures are extrapolated from this value. This system is simply not capable of providing the precision required by current federal, state and local regulations.

First of all, the standard coefficient figure (0.00068) does not take into account that different samples of gasoline will have different coefficients of expansion as a result of such factors as grade, additives, impurities, etc. Given the very slight leakage levels now allowable (±0.05 gallons per hour), it is imperative that the actual coefficient of expansion for the sample being tested be known with much greater certainty. Otherwise, a perfectly sound tank may fail inspection for no other reason than the use of an incorrect coefficient value—or a leaking tank might escape detection.

Not only is the currently used standard coefficient value inaccurate at 60° F., but by merely extrapolating coefficients at different temperatures from this originally inaccurate figure, even greater inaccuracies are introduced into the standardized tables now being used. These tables do not reflect the fact that $\beta$ varies markedly and non-linearly with temperature. Thus, if testing is conducted at anything other than 60° F., inaccurate readings are unavoidable. Of course the greater the temperature deviation from 60° F., the greater the inaccuracies will be.

These and other problems inherent in currently used testing equipment are overcome by the apparatus and method of the present invention. Specifically, the apparatus of this invention provides the means for precisely determining the actual coefficient of expansion for the fluid contained in the tank being tested. With this specific value, the tightness of the tank may be determined with far greater accuracy than is presently attainable.

The apparatus of this invention may be used as a stand-alone unit or may be attached to standard testing equipment so that a known volume of fluid may be drawn off from the system for testing. By carefully monitoring changes in volume and temperature in both the test vessel and the storage tank, the actual coefficient of expansion for any particular fluid may be determined. With this far more accurate figure as a foundation, the precision of the tightness test may be greatly improved.

These and other objects and advantages are obtained through the use of the apparatus and method of the present invention. The particular features of this invention may best be understood by reference to the attached drawings and the following detailed description.

DETAILED DESCRIPTION OF THE PREFERRED EMBODIMENT

Figure 1:
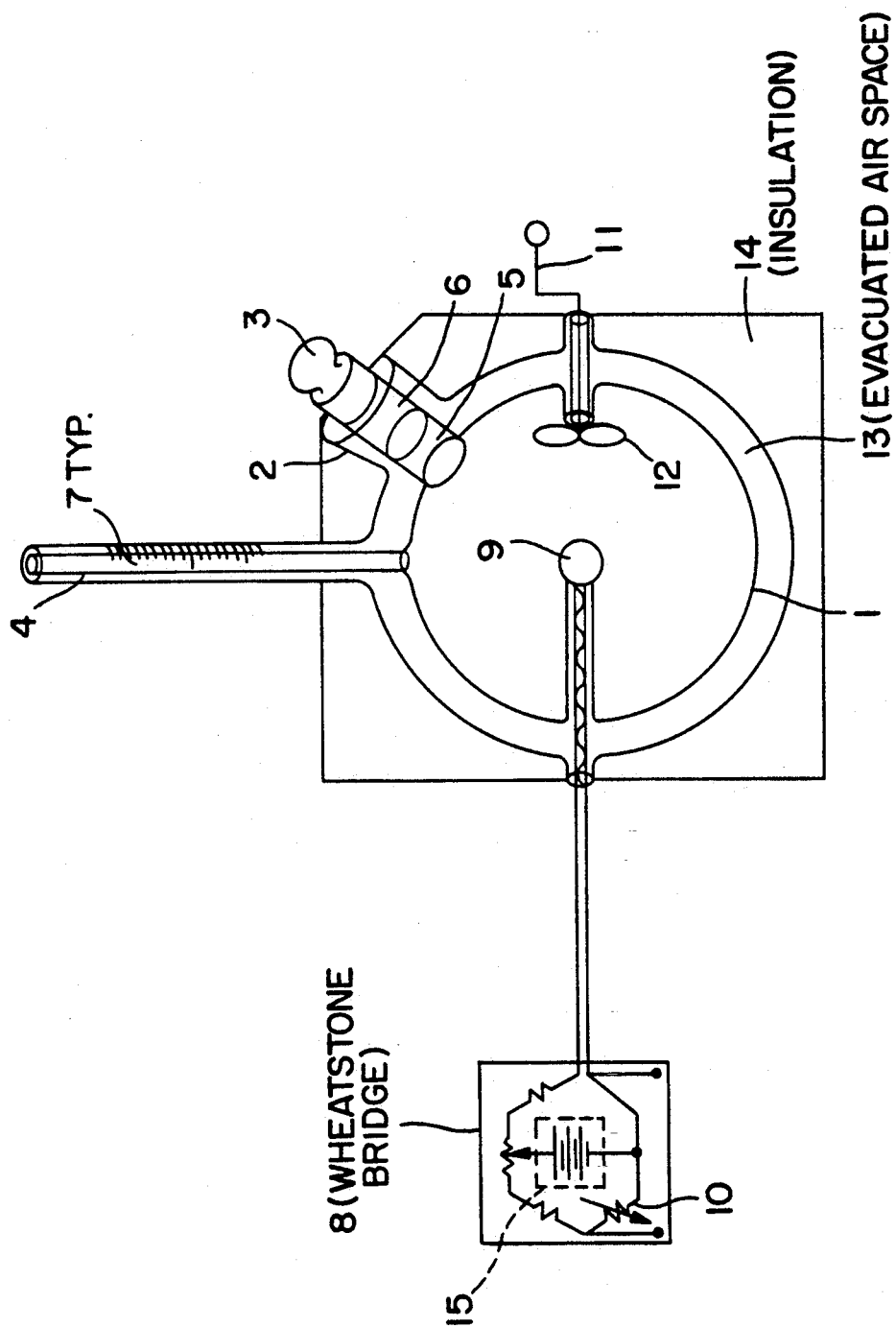
FIG. 1 is a cross-sectional view of the stand-alone apparatus of the present invention.

Various test apparatus have been developed over the years to test tanks for leakage. By far the most popular test method used in the industry is the Petro-tite ® tank tester disclosed in the '055 patent. One serious flaw of the Petro-tite ® system and the prior art is the reliance on standardized thermal coefficients of expansion.

The present invention relates to empirically determining the value for $\beta$, for whatever fluid happens to be in the tank, thus obviating the need for any tables or standardized values. The actual $\beta$ can be empirically derived for the actual temperature of the fluid in the tank to be tested. The present invention can be used as a stand-alone unit, or in conjunction with an existing Petro-tite ® or other prior art tester.

In order to most clearly understand the present invention, it is useful to understand the Petro-tite ® tester. In basic form, an underground tank of known volume $V_O$ is completely filled with fluid. A standpipe with a known diameter is attached vertically above grade onto the fill pipe of the tank. The standpipe is then filled to a reference mark. After a 15 minute interval, the liquid level will be either above or below the reference mark. This level shift will be caused by thermal expansion or contraction of the total volume $V_o$, or can be indicative of a leak. The liquid level in the standpipe is restored back to the reference mark by opening a valve at a connected graduate and allowing fuel to gravity feed between the graduate and standpipe. A graduate reading is taken before and after the standpipe adjustment. This measurement is $\Delta V_{meas.}$, and is indicative of the measured volume changes over the 15 minute time interval. During the same interval, the average temperature change $\Delta T$ of the total tank volume $V_O$ is recorded. Since $\Delta T$ and $\Delta V_{meas.}$ are now known, the volumetric change due to temperature ($\Delta V_T$) can also be calculated by the equation:

$$\Delta V_T = \beta \times V_0 \times \Delta T$$

The volumetric change due to temperature, $V_T$, must be calculated so that the net volume change can be determined by the equation:

$$\Delta V_{net} = \Delta V_{meas.} - \Delta V_T$$

First, $\Delta V_T$ must be calculated, and $\beta$ has historically been a value that is read off of a table. In recent years, $\beta$ has been read off of tables that reflect the temperatures and density of the fluid in the underground tank. Once $\Delta V_T$ is calculated, $\Delta V_{net}$ can be computed $\Delta V_{net}$ is the net incremental volume change of the total volume of fuel contained in the underground tank. Since $\Delta V_{meas.}$ is the fuel gain or loss as measured by the graduated cylinder, then $\Delta V_{net}$ ideally equal 0 if the tank is not leaking. That is, if $\Delta V_{meas.} =$ a 1 gallon gain, and the temperature increase in the tank causes $\Delta V_T$ to be equal to 1 gallon, then the tank is not leaking, because the $\Delta V_{meas.} = \Delta V_T$. However, if $\Delta V_{meas.}$ is not equal to $\Delta V_T$, then a leak may be present. Since $V_O$ is known, and various methods in the prior art have been taught to compensate for tank volumetric expansion, and since $\Delta T$ can be calculated by either circulating underground fuel and taking temperature readings with a thermistor in conjunction with a Wheatstone bridge type circuit, or alternatively, can be taken by a series of thermistors placed throughout the tank with a series of Wheatstone bridge type circuits to derive an average $\Delta T$ value, a technique also taught by the prior art, $\beta$ remains as a primary source of error in the calculation of $\Delta V_T$.

In the early years of tank testing, the average thermal coefficient of volumetric expansion $\beta$ was stated to be 0.00068° F. for gasoline. Since $\beta$ varies markedly with actual temperature, i.e., it has a non-linear relationship with temperature, tests were revised to incorporate the use of American Petroleum Institute (API) hydrometer and conversion tables. According to the API, the density of liquid affects its $\beta$, in addition to temperature. Thus, tables were formulated to account for both temperature and density. Later, the tables were developed to account for different types of fuels, such as jet fuel, diesel fuel and lubricating oils. In the field, these tables are not practical, because the fluids in the tank vary widely between manufacturers, and even between batches of product originating from the same refinery. Hence, because of the number of complex components in any given underground tank, uniform $\beta$ values are not practical for calculating $\Delta V_T$.

The present invention will directly produce the volumetric coefficient of expansion of the fuel within the temperature range of the actual test to be conducted. The present invention obviates the need for measurement of density or API gravity of the fuel to obtain $\beta$. Thus, the present invention has as a principle advantage that standardized $\beta$ values are not needed because $\beta$ will be determined empirically.

Turning to FIG. 1, a test unit is disclosed for determining the volumetric coefficient of thermal expansion ($\beta$) in the field. The device uses the following equation to empirically determine $\beta$:

$$\beta = \frac{\Delta v_t}{v_o \Delta t}$$

Where
$v_t$ = the measured volumetric change of the fluid in the test vessel.
$v_o$ = the measured total volume of the test vessel.
$t$ = the measured temperature change of the fluid contained within the test vessel.

After $\beta$ is derived, then the $\Delta V_T$ for the underground tank can be calculated by $\Delta V_T = \beta \times V_O \times \Delta T$, and then $\Delta V_{net}$ can be evaluated to complete the test. Referring to FIG. 1, a glass vessel (1) of known value $v_O$ is tipped counterclockwise and filled with a fuel sample through the stopper opening (2). The stopper (3) is designed to purge air from the capillary tube (4) when inserted into the stopper opening by acting as a plunger when inserting the straight section (5) and then forming a seal when the straight section (5) is fully inserted to its seat (6). The stopper is geometrically designed to purge the capillary tube (4) of air such that the liquid level rises to a reference mark (7). The reference marks (7) are calibrated to provide for known volumetric quantities. In this manner, capillary tube (4) with reference marks (7) is a graduated tube from which volumetric change can be read. As the liquid level in the capillary tube (4) changes due to the temperature change of the fuel sample contained in vessel (1), a Wheatstone bridge circuit (8) senses the change in current due to the resistance change presented by thermistor (9), which is connected in series with the Wheatstone bridge (8) and is immersed in the volume of fuel and is nulled when the level reaches a reference mark (7) and nulled again when the level passes a second reference mark (7). Thus, $\Delta t$ can be derived from the Wheatstone bridge (8) and the thermistor (9) circuit because the variable resistor (10) in the bridge circuit (8) is calibrated such that the impedance of the thermistor (9) and the Wheatstone bridge circuit (8) power supply and meter (15) voltage are calibrated so that thermistor (9) reflects that of a thermometer in degrees Fahrenheit. Such temperature sensing probes are well known in the art. The capillary tube (4) has typical markings (7) that are also well known in the art, and represent exact volume measurements. Thus $\Delta v_t$ and $\Delta t$ are measured, and $v_o$ is known. Therefore, $\beta$ can be empirically derived for a sample of fuel drawn from the underground tank.

Because $\beta$ changes with temperature, it is important that the temperature of the fuel in vessel (1) remains the same as the temperature of the fuel within the underground tank after the sample is taken. In addition, it is important that thermistor (9) measure an average fluid temperature for the fluid contained with vessel (1). For these reasons, an evacuated air space (13) as well as insulation (14) surrounding the vessel (1) will serve to insulate the fuel sample in order to inhibit rapid temperature change. In addition, a handle crank (11) turns a stirring propeller (12) in order to create a uniform temperature throughout the vessel. More significantly, the crank can be used to initiate a temperature change by adding heat energy to the system. In addition, it is contemplated that the unit can be cooled if the fuel sample is too warm.

It is also contemplated that a second Wheatstone bridge circuit (not shown) with two corresponding thermistors and no variable resistor can be set up so that the one thermistor is placed along side the thermistor (9), and another thermistor is placed in the underground fuel tank. In this manner, the fuel sample in the vessel can be heated or cooled until its temperature is exactly equal to the temperature of the fuel in the underground fuel tank. In this manner, the accuracy of $\beta$ will not be sacrificed by the removal of the fuel from the underground closed system.

To explain the use of the second Wheatstone bridge (not shown), the bridge differs from Wheatstone bridge circuit (8) in that no variable resister (10) is contained therein. Only two identical thermistors are used; one adjacent to thermistor (9) and one submerged in the underground tank. Test leads of equal length should be used to connect these two thermistors to the second Wheatstone bridge. The temperature of the fluids in vessel (1) can be cooled by subjecting the entire test unit in FIG. 1 to a cool environment (e.g., ice), or the fluid in vessel (1) can be heated by propeller (12). It is anticipated that crank (11) can be replaced by a high speed servo motor controlled by a switch. In this manner, when the second Wheatstone bridge reads a middle or nulled reading, the temperature of the two corresponding thermistors are equal, and so are their respective surrounding fluids.

It is completely understood that the entire embodiment as set forth in FIG. 1 can be controlled by a computer. That is, $\Delta v$ can be read by a series of fluid detectors, and the thermistor (9) can be read by an analog to digital converter. Both the output of the fluid detectors and the thermistor (9) can be scanned by the computer to read $\Delta v_t$ and $\Delta t$. In addition, the computer can control a DC servo motor that turns propeller (12) to circulate the fluid and warm it if necessary. If cooling is required, refrigeration coils can be contained within space (13), and the coolant system can be controlled by the computer. The computer would alternatively heat or cool the fluid in vessel (1) in response to the readings obtained by the second Wheatstone bridge (not shown), and compare the temperature of the fluid in vessel (1) with the temperature of the fluid in the underground tank. Thus, the computer could ensure thermal equilibrium between the fluid in the test vessel (1) and the fluid in the underground tank by means of closed loop feedback control. The temperature of the fluid in the underground tank is averaged throughout the tank if the fluid is kept circulating. However, it is contemplated that various temperature sensing arrangements could be used with the underground tank to derive an average temperature, (e.g., a plurality of thermistors spaced apart).

Figure 2:
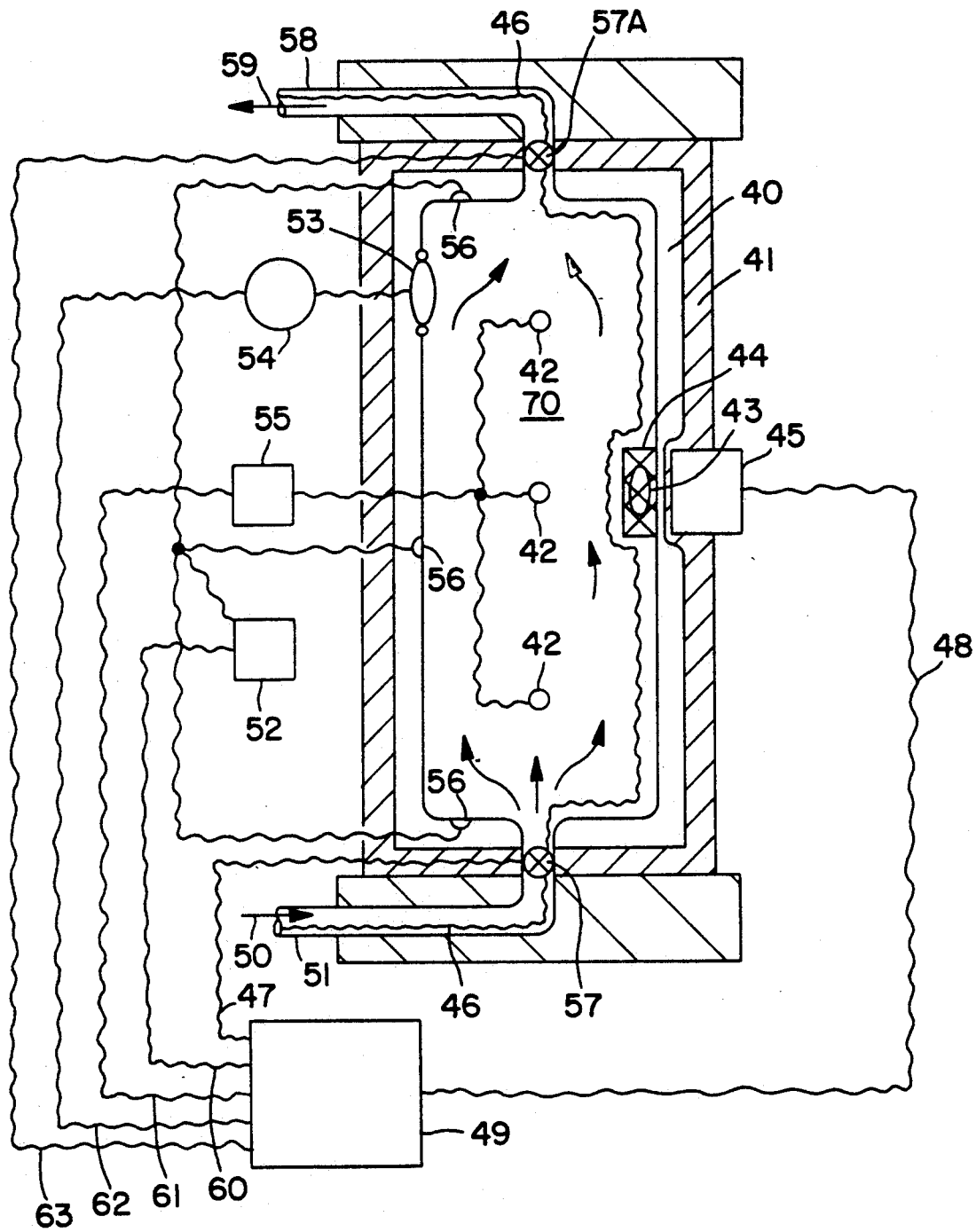
FIG. 2 is a cross-sectional view of an alternative embodiment wherein the apparatus of the present invention may be attached to any of the known systems used for testing tank tightness.

With respect to FIG. 2, a second alternative embodiment, of the present invention is shown. In this embodiment, connection of the present invention to the Petro-tite ® test system is contemplated, although the present invention can be used with any tank testing device that requires that the value of $\beta$ be used to determine $\Delta V_T$. The present invention can also be used with either the manually operated version of the Petro-tite ® system, as described in the '055 patent, or an automated test set as disclosed in U.S. Pat. No. 4,954,973.

The device as set forth in FIG. 2 is connected to the tank tester disclosed at FIG. 1 of the '055 patent. Pump inlet tube (36) in that patent carries fuel from the underground tank (28) through the pump (34). The circulation path through vessel (70) of this embodiment of the present invention is connected in parallel to the circulation path through pump inlet tube (36) of the '055 patent. Thus, the manner of connection of inlet port (51) and outlet port (58) of the present invention are well known to those skilled in the art. Therefore, the fluid that is pumped through vessel (70) is now denoted as the entering fluid (50) and exiting fluid (59) as indicated at FIG. 2 of the present invention. Vessel (70), of known volume $v_o$, has the fluid in it that is being circulated through the underground tank. It will be known to those skilled in the art how to use various bypass valves and the connectors to connect the apparatus at FIG. 2 of the present invention to tank testers that require a $\beta$ value to be used.

A primary advantage of the embodiment shown at FIG. 2 is that the fluid is circulated through vessel (70), so that the temperature of fluid shown at (50) and (59) are equal to the average temperature of the fuel in the underground tank. Circulating the fluid through vessel (70) tempers the interior walls of that vessel. Solenoid valves (57) and (57a) are opened and closed to permit samples of fuel to be drawn into the vessel (70), and both remain open for a time before measurements are taken to temper the interior walls of the vessel. This improves test accuracy. Valves (57) and (57a) are controlled via lines (47) and (63) respectively, which are connected to a general purpose computer (49). General purpose computer (49) is connected to the proper signal conditioning circuitry well known in the art so that the computer (49) can cause valves (57) and (57a) to open and close. Grounding conductors (46) are connected to each of the valves to prevent static electrical charge buildups on the devices. With the testing of petroleum products, such as gasoline, charge buildup should always be avoided as a matter of safety.

As fluid is circulated through vessel (70), it is important to keep the temperature of the test fluid contained therein equal between the inlet and outlet, such that the temperature of fluid (50) equals the temperature of fluid (59), which are both equal to the average or mean temperature of the fluid in the underground tank. Therefore, the embodiment in FIG. 2 has an evacuated air space (40) and insulated space (41). In an alternative embodiment, spaces (40) and (41) could be replaced with a single layer of gold, and the entire vessel (70) with its test apparatus could be submerged into the underground tank, thus ensuring that the temperature of the fluid in vessel (70) equals the temperature of the fluid in the underground tank.

Because the fluid is allowed to initially flow through vessel (70), the gasoline need not be continuously circulated. However, a magnetic agitation motor (45) (such as is used in many chemistry labs) can be used if agitation is desired. The motor (45) is connected to agitator (43), which moves the internal fluid around. Agitator (43) is held in place by cage (44). Agitation motor (45) is controlled by line (48) which is coupled to the computer (49), with appropriate interface circuitry. Motor (45) can be activated to initiate a positive temperature change by generating friction inside insulated vessel (70). Also, it is known that refrigerated coils could be passed through air space (40) to cool down the fluid in vessel (70). Such refrigeration systems and heating systems (e.g., the heating system disclosed as agitation motor (45) and agitator (43)) will be controlled by computer (49), and are well known in the art.

Computer (49) has access to temperature measurements from within the vessel (70). In addition, it is understood that computer (49) could be connected to an underground tank temperature system, consisting primarily of thermistors, so that computer (49) can cause the fluid in vessel (70) to equal the average temperature in the underground storage tank.

Computer (49) is used to measure and record changes in volume of the fluid in vessel (70). Metal film diaphragm strain gauge (53) is connected to a volumetric change sensor (54). The volume sensor (54) outputs a voltage level that the computer (49) can convert to a digital value, (e.g., an analog to digital convertor is used). Therefore, computer (49) can read the $\Delta v_t$ value due to the temperature change of the fluid in vessel (70) over time. It should be noted that for a purged hydraulic vessel (70), the slightest volumetric change within the vessel will initiate a considerable pressure change which can be easily detected with strain gauge (53) due to the incompressibility of the enclosed fluid. Optimally, the temperature of the fluid in vessel (70) is kept equal to the average temperature in the fluid in the underground tank. A Wheatstone bridge with corresponding thermistors, not shown, can be read by computer (49) to achieve this capability. In effect, the computer (49) would be able to compare the average temperature of the fluid in the underground tank with the fluid in vessel (70). Computer (49), then uses its feedback capability to affect the appropriate change in temperature to the fluid in vessel (70).

Computer (49) is also used to measure and record the temperature change of the fluid in vessel (70). Thermistors (42) are connected to a Wheatstone bridge circuit (55) (or appropriate temperature measurement unit) that detects temperature change. Since temperature change as it relates to volume change is what is needed to empirically derive $\beta$, absolute temperature measurements are not important. Rather, only the temperature changes are critical. Thus, a Wheatstone bridge calibrated to read degrees Fahrenheit, with an output (61), connected to computer (49) is suitable for measurement purposes. Thus, the computer (49) reads $\Delta t$ and $\neq v_t$.

Finally, the computer (49) can be programmed to read the temperature changes associated with the walls of vessel (70) and compensates for any volumetric changes due to vessel expansion or contraction because the coefficient of volumetric expansion of the material comprising the vessel walls has a known value. Thermistors (56) are connected to a Wheatstone bridge (52), which outputs along line (60) the $\Delta t_v$ (temperature change of vessel (70) surface). Therefore, computer (49) can be programmed accordingly by those skilled in the art to compensate for any plurality of temperature deviations, based on both the fluid in vessel (70) and the temperature change $\Delta T_v$ of the vessel walls. In the end, the computer (49) will calculate the value of $\beta$ by the equation:

$$\beta = \frac{\Delta v_t}{v_0 \Delta t}$$

In the computer embodiment, all calculations can be performed by computer (49). It is also contemplated that the teachings at FIG. 2 can be combined by those skilled in the art with the teachings of U.S. Pat. No. 4,954,973, where a completely automated tank testing system is shown.

Finally, this $\beta$ is used in the overall underground tank test where $V_T = \Delta \times V_O \times \Delta T$. This $\Delta V_T$ is compared with $\Delta V_{meas.}$ (of the overall underground tank) to determine $\Delta V_{net}$, which is dispositive of whether the underground tank is leaking.

It is recognized that vessel (70) can be tempered to equal the average fluid temperature in the underground tank. This is a second principle object of the invention. Also, valves (57) and (57a) are closed as soon as tempering occurs, so that the $\beta$ can typically be derived where there is no fluid flow. $\beta$ can be calculated repeatedly as often as necessary to ensure accuracy. Obviously, when valves (57) and (57a) are closed, the Petro-tite ® tester works normally because of the connection in parallel between inlet tube (36) of the '055 Petro-tite ® patent and the present invention.

What I claim is:

1. An apparatus for determining the coefficient of expansion for a fluid by measuring changes in volume and temperature of said fluid, said apparatus comprising:
   (a) a test vessel of known volume into which at least a portion of said fluid is introduced;
   (b) volume measurement means comprising a graduated tube; and
   (c) temperature determining means comprising a thermistor; and
   (d) means for correlating said changes in volume and temperature to determine said coefficient of expansion.

2. An apparatus as defined in claim 1 wherein said vessel also comprises means for producing an increase or decrease in temperature of the fluid in said vessel.

3. A method for detecting fluid leaks comprising the steps of:
   (a) introducing at least a portion of said fluid into a test vessel of known volume via an opening in said vessel;
   (b) compressing a stopper into said vessel opening to form an air-tight seal over said opening;
   (c) measuring the volume of said fluid contained within said vessel by reading a graduated tube connected to said vessel wherein said fluid may flow between said vessel and said graduate and wherein the change in the volume of said fluid in said vessel due to a change in the temperature of said fluid is observable by reference to said graduated tube; and
   (d) measuring a temperature change of said fluid contained within said vessel by use of a thermistor;
   (e) determining the volumetric coefficient of thermal expansion for said fluid from said volume and temperature changes; and
   (f) using said coefficient of expansion in conjunction with said volume and temperature changes to detect any leakage of said fluid.

4. A method for detecting fluid leaks as defined in claim 3 wherein a computer is utilized to monitor said volume measurement means and said temperature determining means.

5. A method for detecting fluid leaks comprising the steps of:
   (a) filling a test vessel of known volume with said fluid;
   (b) measuring the volume change of said fluid contained within said vessel;
   (c) determining the temperature change of said fluid contained within said vessel;
   (d) determining the coefficient of expansion for said fluid from said volume and temperature changes; and
   (e) using said coefficient of expansion in conjunction with said volume and temperature changes to detect any leakage of said fluid.

6. An apparatus for determining the volumetric coefficient of thermal expansion for a fluid, said apparatus comprising:
   (a) a test vessel of known volume having an opening therein such that a portion of said fluid may be introduced into said vessel;
   (b) a stopper capable of forming an air-tight seal over said opening;
   (c) a volume measurement means for determining the volume of said fluid in said vessel comprising a graduated tube attached to said vessel such that said fluid may flow between said vessel and said graduated tube and wherein the changes in the volume of said fluid in said vessel due to changes in the temperature of said fluid are observable by reference to said graduated tube; and
   (d) a temperature determining means comprising one or more Wheatstone bridge type circuits in series with one or more thermistors such that the temperature of the fluid in said vessel may be determined.

7. An apparatus as defined in claim 6 wherein said vessel further comprises cooling or heating means attached thereto such that the temperature of the fluid in said vessel may be adjusted.

8. An apparatus as defined in claim 6 wherein said volume measurement means and said temperature determining means are attached to and monitored by a computer.

9. An apparatus s defined in claim 8, wherein said apparatus is further attached to conventional tank tightness testing equipment.

* * * * *